United States Patent [19]

Kuehl

[11] Patent Number: 4,797,267

[45] Date of Patent: Jan. 10, 1989

[54] METHOD OF PRODUCING ROD-SHAPED ZSM-5 ZEOLITE

[75] Inventor: Guenter H. Kuehl, Cherry Hill, N.J.

[73] Assignee: Mobil Oil Corporation, New York, N.Y.

[21] Appl. No.: 139,098

[22] Filed: Dec. 23, 1987

[51] Int. Cl.$^4$ .............................................. C01B 33/28
[52] U.S. Cl. .................................... 423/329; 423/328; 502/60; 502/77
[58] Field of Search ............... 423/328 C, 328 T, 329, 423/329 T

[56] References Cited

U.S. PATENT DOCUMENTS

| | | | |
|---|---|---|---|
| 3,386,801 | 6/1968 | Kuehl .................................. | 423/329 |
| 3,702,886 | 11/1972 | Argauer et al. ..................... | 423/328 |
| 4,100,262 | 7/1978 | Pelrine ................................ | 423/329 |
| 4,203,869 | 5/1980 | Rollmann ............................ | 502/77 |
| 4,205,053 | 5/1980 | Rollmann et al. .................. | 423/329 |
| 4,331,641 | 5/1982 | Hinnenkamp et al. .............. | 423/277 |
| 4,511,547 | 4/1985 | Iwayana et al. .................... | 423/329 |
| 4,537,757 | 8/1985 | Chono et al. ....................... | 423/328 |

FOREIGN PATENT DOCUMENTS

| | | | |
|---|---|---|---|
| 0000669 | 2/1979 | European Pat. Off. . | |
| 0021674 | 1/1981 | European Pat. Off. ............ | 423/329 |
| 0021675 | 1/1981 | European Pat. Off. . | |
| 0026962 | 4/1981 | European Pat. Off. ............ | 423/329 |
| 0026963 | 4/1981 | European Pat. Off. ............ | 423/329 |
| 0014546 | 2/1983 | European Pat. Off. . | |
| 0093519 | 11/1983 | European Pat. Off. ........ | 423/328 T |

OTHER PUBLICATIONS

Ryszard Mostowicz et al, Zeolites vol. 2, No. 2. Apr. 1982 pp. 143–146.
Ryszard Mostowicz et al, Zeolites vol. 3, No. 3, Jul. 1983 pp. 219–225.
V. N. Romannikov et al, Zeolites vol. 3, No. 4, Oct. 1983 pp. 311–320.
Majid Ghamani et al Zeolites vol. 3, No. 2, Apr. 1983 pp. 155–162.
F. Gatti et al, Zeolites vol. 6, No. 4, Jul. 1986 pp. 312–316.
H. Lerner et al, Zeolites vol. 5, No. 3, May 1985 pp. 131–134.
J. L. Casu et al. Zeolites vol. 3, No. 3, Jul. 1986 pp. 186–187.
Proceedings of the 5th Internatl Conf on Zeolites (Naples, Italy, Jun. 1980), Ed LVC Rees. Pub. Heyden (London) 1980 "Metastable Phase Transformations and Morphological Changes of NA–,NA, K– and K–ZSM–5 With Salt Additions", A. Erdem & L. B. Sand.
ACS Advances in Chemistry Series No. 101 (1971) (Proceedings of 2nd Internatl Conf, Worcester, Mass, Sep. 1970) "Crystallization of Zeolites in the Presence of a Complexing Agent, Part II", Gunter H. Kuhl.
Journal of Crystal Growth 8 (1971) 291–294) North–Holland Publishing Co. "Gel Growth of Large Crystals of a Sodium A and Sodium X Zeolites", J. F. Charnell.
Journal of Catalysis 60, 241–256(1979) "Crystallization and Metastable Phase Transformations of Zeolite ZSM–5 in the $(TPA)_2O-Na_2O-K_2O-Al_2O_3-SiO_2-H_2O$ System", A. Erdem and L. B. Sand.
A. Nastro and L. B. Sand "Growth of Larger Crystals of ZSM-5 in the System $4(TPA)_2O-38(NH_4)_2O-x(Li,Na,K)_2 O-Al_2O_3-59SiO_2-750H_2O$," Zeolites 1983 vol. 3, Jan. pp. 57–62.

Primary Examiner—John Doll
Assistant Examiner—Jackson Leeds
Attorney, Agent, or Firm—Alexander J. McKillop; Michael G. Gilman; Laurence P. Hobbes

[57] ABSTRACT

This disclosure is concerned with the crystallization of ZSM-5 zeolites and, more particularly, is concerned with the preparation of high silica ZSM-5 zeolites having a silica-to-alumina ratio of greater than 70, up to and approaching infinity, by control of the pH so as to obtain rod-shaped crystals.

4 Claims, 9 Drawing Sheets

FIG. I

Crystallization in the Presence of Phosphate a) $(NH_4)_2HPO_4$

FIG. Ia

Example 3
eq. $HPO_4^= / SiO_2 = 0.142$ b) $(NH_4)_3PO_4$

FIG. Ib

Example 4
eq. $HPO_4^= / SiO_2 = 0.142$

FIG. 2

Crystallization in the Presence of Tartrate

FIG. 2a a) Example 6
eq. tart./$SiO_2$=0.159
Final pH: 10.13

FIG. 2b b) Example 7
eq. tart./$SiO_2$=0.106
Final pH: 10.67

FIG. 2c c) Example 8
eq. tart./$SiO_2$=0.071
Final pH: 11.06

FIG. 3

Crystallization in the Presence of Citrate

Example 10
eq. citr./SiO$_2$ = 0.159
Final pH: 10.16

FIG. 4

Crystallization in the Presence of Oxalate

FIG. 4a

Example 12
eq. Oxal./$SiO_2$=0.160
Final pH = 9.83

FIG. 4b

Example 13
eq. Oxal./$SiO_2$=0.106
Final pH = 10.76

FIG. 4c

Example 14
eq. Oxal./$SiO_2$=0.070
Final pH = 11.74

FIG. 5

Crystallization in the Presence of Gluconate

Example 15
eq. Gluc./$SiO_2$=0.106
Final pH = 11.64

FIG. 6

Crystallization in the Presence of Salicylate

Example 16
eq. Salic./$SiO_2$=0.106
Final pH = 11.42

FIG. 7

Crystallization in the Presence of EDTA (Example 17)

eq. $EDTA/SiO_2 = 0.143$

Crystallization in the Presence of Acetate

FIG. 8a

Example 19
eq. Acet./SiO$_2$=0.159
Final pH: 9.73

FIG. 8b

Example 20
eq. Acet./SiO$_2$=0.107
Final pH: 10.61

Crystallization in the Presence of Carbonate

FIG. 9a

Example 22
eq. $HCO_3^-/SiO_2$=0.16
Final pH: 10.16

FIG. 9b

Example 23
eq. $HCO_3^-/SiO_2$=0.106
Final pH: 10.35

FIG. 9c

Example 24
eq. $HCO_3^-/SiO_2$=0.053
Final pH: 10.44

FIG. 10

Crystallization in the Presence of Carbonate

Example 25
eq. $HCO_3^-/SiO_2$=0.078
Final pH: 9.94

10μ

METHOD OF PRODUCING ROD-SHAPED ZSM-5 ZEOLITE

CROSS REFERENCE TO RELATED APPLICATIONS

This is a continuation of copending application Ser. No. 870,659, filed on June 2, 1986, which is a continuation of copending application Ser. No. 636,044, filed on July 30, 1984 which in turn is a continuation-in-part of Ser. No. 539,632 filed Oct. 7, 1983, which, in turn, is a continuation of Ser. No. 372,872 filed Apr. 29, 1982, and all now abandoned.

BACKGROUND OF THE INVENTION

1. Field of the Invention

This invention is concerned with the crystallization of high silica ZSM-5 zeolite and, more particularly, is concerned with the preparation of high silica ZSM-5 zeolites having a silica-to-alumina ratio of greater than 70, up to and approaching infinity, by control of the pH so as to obtain zeolitic compositions having a rod-shaped morphology by controlling the final pH of the reaction medium to a range of 9.5–10.5.

2. Description of Prior Art

High-silica zeolites are extremely well known in the art and have been the subject of much attention in both the patent and technical literature. It has now been discovered that the morphology of the crystals produced from a forming solution vary depending upon the final pH of the reaction medium. As is well known in the art of the synthesis of zeolites, it is extremely difficult to control the pH and, in fact, it is extremely difficult to even measure the pH during the crystallizaton since crystallization is usually carried out in closed vessels under autogeneous pressure such that exact measurements are not practical. It is known in the art that there is a certain pH range over which ZSM-5 type zeolites can be prepared and, in this connection, U.S. Pat. No. 4,061,724 discloses at column 3 the pH range of 10–14. However, this patent does not teach that the morphology of the resulting crystals is dependent on the pH of the reaction medium. It is also known that the pH is difficult to control and that it varies during the course of crystallization.

Rod-shaped silica polymorphs are disclosed in U.S. Pat. No. 4,073,865. These materials are stated to be a novel silica polymorph and they require, for their preparation, the presence of a fluoride ion in the reaction media. The resulting rod-shaped products are stated to be extremely hydrophobic thereby making it particularly advantageous in absorption separations requiring minimum water absorption or at least interference from water vapor and the absorption of less polar molecules. Preparation of the materials involving the use of a fluoride ion has many disadvantages including disposal problems in connection with the waste liquids. Similarly, the off gas resulting from the calcination of the silica materials contains hydrogen fluoride and silica tetrafluoride thereby preventing releasing to the atmosphere until suitable purification techniques are employed.

Accordingly, it is the object of this invention to produce high silica ZSM-5 in the absence of a fluoride from a reaction medium which does not contain a fluoride ion said ZSM-5 being rod-shaped and having a high degree of hydrophobicity. It is noted that the production of rod-shaped ZSM-5 from a fluoride free media is not novel per se and, in fact, Example 27 of U.S. Pat. No. 3,702,886 specifically teaches the same. However, instant invention represents an improvement over the process toward said Example in that the products obtained by the process of this invention are more uniformly rod-shaped than those in said Example 27.

SUMMARY OF THE INVENTION

This invention is concerned with carrying out the crystallization of ZSM-5 type zeolites using the same reactants as have previously been described in various patents and technical articles; but carrying out the crystallization in the presence of a buffer such that the pH is maintained within the range of 9.5–10.5 to produce products which are rod-shaped and characterized by having a length-to-width (L/W) ratio of at least 3:1 and a water sorption capacity of less than 2.0 grams/100 grams of solid.

DESCRIPTION OF PREFERRED EMBODIMENTS

It has long been recognized in the synthesis of various crystalline aluminosilicates of the low-silica type that complexing agents such as phosphates, arsenates, tartrates, citrates, ethylenediaminetetraacetate, etc. also can act as a buffer. The use of these materials has been primarily directed to those situations where it was desired to increase the silica-to-alumina ratio of the zeolite by complexing the alumina. Thus, procedures of this type are disclosed in U.S. Pat. Nos. 3,886,801; 4,203,869; as well as an article entitled "Influence of Phosphate and Other Complexing Agents on the Crystallizaton of Zeolites," appearing in Molecular Sieves, Soc. of Chem. Industry, London, pp 85 and following (1967).

All of the above three publications have for a common goal the use of a material which complexes the aluminum such that a zeolitic product is obtained which has a higher silica-to-alumina ratio than that which would normally be obtained from the same reaction medium in the absence of such complexing agents. As indicated earlier, certain of the complexing agents are also buffers, but they are used in amounts such that their primary objective is to complex all or a portion of the aluminum thereby raising the silica-to-alumina ratio. In the above referred to article, as well as U.S. Pat. No. 3,386,801, low-silica zeolites are dealt with such that the complexing agent added does not complex all the aluminum due to equilibrium considerations. On the other hand, U.S. Pat. No. 4,088,605 which is directed towards high silica-to-alumina ratio zeolites, discloses that the function of the complexing agent is indeed to complex substantially all the available aluminum which, of course, also raises the silica-to-alumina ratio of the final crystalline product. Patents such as U.S. Pat. No. 3,949,059 teach the use of buffers in the crystallization of a low-silica zeolite. The novel process of this invention is not concerned with the use of complexing agents which may additionally be buffers in amounts such that they complex with aluminum and raise the silica-to-alumina ratio of the zeolitic product nor is it concerned with low-silica zeolites. In other words, in the novel process of this invention a buffer is used in an amount such that the silica-to-alumina ratio of the product is substantially unaffected, i.e., it would have the same high silica-to-alumina ratio whether or not a buffer were used.

The novel process of this invention is based on the the discovery that the pH of the final reaction mixture is of paramount importance in establishing the production of high silica, rod-shaped ZSM-5 type crystalline products. It has been discovered that if the final pH is controlled in the range of 9.5-10.5 that rod-shaped ZSM-5 is crystallized. On the other hand, if the final pH is not controlled within the 9.5-10.5 pH range, a ZSM-5 havig different morphology is obtained. For example, near spherulitic morphology is obtained when final pH values were above 12 and up to 12.5 and an intermediate type morphology is found in the range of 11 to 12.

As has heretofore been stated, it is well known in the art that the pH of a reaction mixture in zeolite synthesis cannot be carefully controlled and it does vary over fairly wide ranges during the steps of gel preparation, aging and during the course of crystallization. The novel process of this invention minimizes the variation in pH by using a buffer which would effectively control the pH to the desired 9.5-10.5 value thereby greatly facilitating the crystallization of ZSM-5 having rod-shaped morphology.

The buffer utilized is not narrowly critical and any buffer capable of stabilizing the pH in this range at 200° C. in a pressure vessel can facilitate crystallization of the desired morphology. Typical buffers would include phosphates, tartrates, citrates, oxalates, ethylenediaminetetraacetate, and acetate, particularly the ammonium salts, alkali metal salts, such as sodium, and the free acids.

For reasons which are not understood, it has been found that a carbonate buffer, simply will not correlate with the final pH to produce the desired rod-shaped ZSM-5. Accordingly, the use of a carbonate buffer is outside the scope of this invention.

The amount of buffer which is used is determined by many factors, including the particular nature of the buffer itself, as well as the final pH which is desired. In general, it can be stated that the buffer has to be used in sufficient amounts such that it does act as a buffer in order to stabilize the pH.

In general, it can be stated that the amount of buffer used is such that there is present in the reaction medium 0.1 to about 0.35 equivalents of buffer per mol of silica. Greater amounts of buffer can be used, but the increased salt concentration reduces the rate of crystallization. As has heretofore been stated, the novel process of this invention resides in controlling the pH during crystallization of a high-silica zeolite. The only practical method to control the pH is by the use of a buffer. As has also been indicated, it is difficult to measure the pH during crystallization so that a very effective correlation has been made by measuring the final pH, i.e., the pH after crystallization. It is precisely this final pH which has been correlated with a morphology of the high-silica zeolites which are produced.

The novel process of this invention concerned with the synthesis of high-silica ZSM-5 zeolites this expression is intended to define a crystalline which has a silica-to-alumina ratio greater than 70 and preferably, greater than 500, up to and including those siliceous materials where the silica-to-alumina ratio infinity or as reasonably close to infinity as practically This latter group of highly siliceous materials is exemplified by U.S. Pat. Nos. 3,941,871; 4,061,724; 4,073,865; 4,104,294 (herein incorporated by reference); wherein the materials are prepared from reaction solutions which involve no deliberate addition of aluminum. However, trace quantities of aluminum are usually present due to the impurity of the reactants. It is also to be understood that the expression "high-silica zeolite" also specifically includes those materials which have other metals besides silica and/or alumina associated therewith, such as boron, iron, gallium, etc. U.S. Pat. No. 3,702,886 describing and claiming ZSM-5 is incorporated herein by reference.

As is known in the art, zeolites of this invention are prepared from a forming solution containing water, a source of quaternary ammonium cations, an alkali metal, silica, with or without added alumina or with or without the presence of additional metals. As is known in the art, the forming solution is held at elevated temperatures and pressures until the crystals are formed and thereafter the crystals are removed.

The novel process of this invention resides in using the exact forming solutions which have previously been taught for the preparation of ZSM-5 and adding therewith a buffering agent so as to have a final pH within the range of 9.5-10.5.

As has heretofore been indicated, the rod-shaped ZSM-5 zeolite produced by the novel process of this invention is rod-shaped, has a silica-to-alumina ratio greater than 70, has a length-to-width ratio greater than 3, and has a water sorption capacity of less than 2.0 grams per 100 grams of solid. It has also been discovered that the hydrophobicity of the products increases with increasing length-to-width ratios.

The following examples will illustrate the novel process of this invention using various buffering agents. In all cases, colloidal silica sol identified as Ludox LS containing 30 weight percent silica was used for crystallizations. The molar ratio of silica to tetrapropylammonium bromide (TPABr) was held nearly constant at 19.8 to 19.9 and that of sodium hydroxide to TPABr was held constant at 3.05 and the crystallization temperature was held constant at 200° C. Percent crystallinity is based on X-ray comparison with a highly crystalline reference sample.

Generally, the reaction mixtures were prepared by dissolving tetrapropylammonium bromide, alkali hydroxide and a particular salt, water, and adding (Ludox) silica sol to this solution.

All crystallizations were carried out in non-stirred pressure vessels equipped with Teflon liners and heated by immersion in a constant temperature silicone oil bath.

It is specifically noted that only Examples 2, 3, 4, 6, 10, 12, 17, 19, and 21 produce rod-shaped crystalline alminosilicates and are within the scope of this invention. The remaining Examples are presented merely to show that unless the final pH is controlled to within the 9.5-10.5 final pH range that rod-shaped ZSM-5 simply is not obtained. Examples 22 thru 25 show the unreliability of using a carbonate buffer.

EXAMPLES 1-4

Crystallization of High-Silica ZSM-5 in the Presence of Phosphate

The reaction mixture of Example 1 was prepared using 4.2 mols of $(NH_4)_2HPO_4$ per mol of tetrapropylammonium bromide (TPABr) in an attempt to complex alumina impurities and buffer the sodium hydroxide added. The amount of buffer added was equivalent to 0.42 equivalents of $HPO_4=$ per equivalent of silica. The amount of $(NH_4)_2HPO_4$ was lowered in Examples 2 and 3 to amounts ranging from 0.21 to 0.14 equivalents per mol of silica respectively. Finally, ammonia was added in Example 4 to obtain an equimolar concentration of $(NH_4)_2HPO_4$ and $NH_3$. The equivalent amount of $HPO_4=$ per mole of silica was 0.14. The reaction mixtures that crystallized completely had the highest pH, the products of Examples 3 and 4 had practically identical sorption capacities as will be shown in Table 1.

EXAMPLES 5-14

Figures 2, 2A:
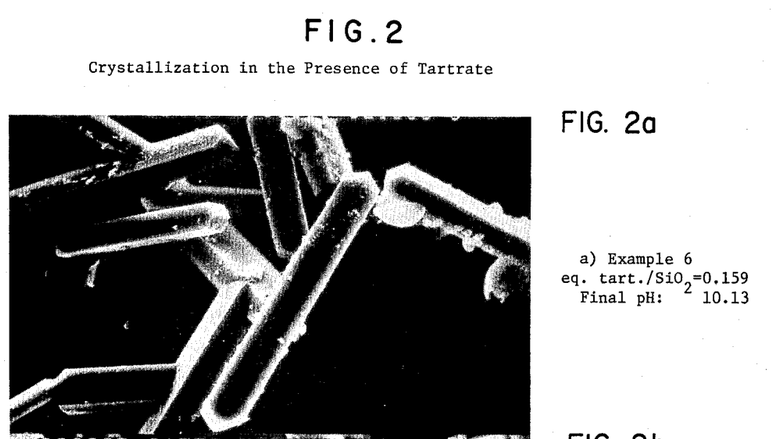
FIGS. 2a, 2b, and 2c are scanning electron-micrographs of the products of Examples 6, 7 and 8 respectively.
Figure 2B:
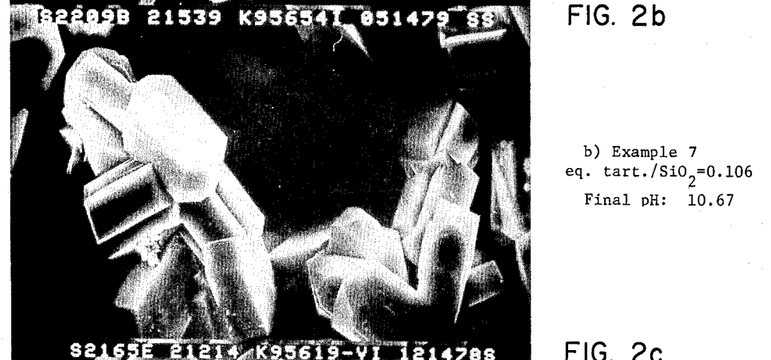
Figure 2C:
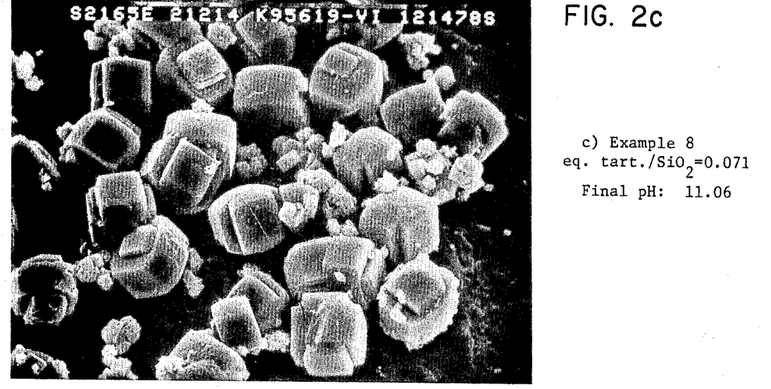
Figure 3:
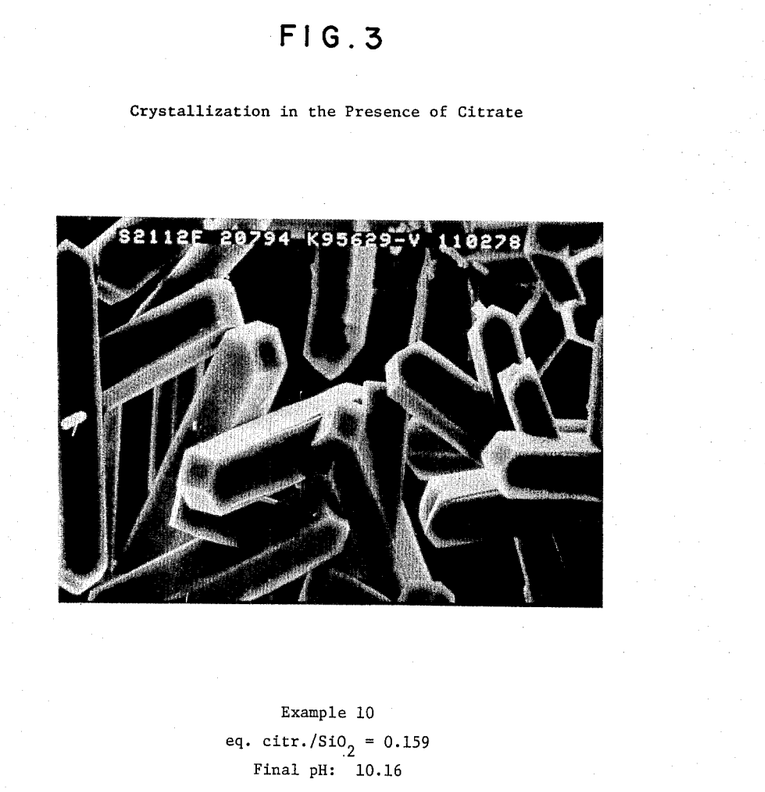
FIG. 3 is a scanning electron-micrograph of the product of Example 10.

Crystallizaton of High Silica ZSM-5 in the Presence of Tartrate, Citrate and Oxalate The reaction mixtures containing 2.1 moles of ammonium salts of tartaric, citric, and oxalic acid per mol of TPABr crystallized incompletely or not at all (Examples 5, 9 and 11). This amount is equivalent to 0.21 equivalents of tartrate and oxalate (Examples 5 and 11) and 0.32 equivalents of citrate (Example 9) per mol of silica. Common to all three is the very low pH of the final solution. Then the amount of tartaric acid was reduced, the crystallinity of the products improved. Simultaneously, the crystals became less elongated (see FIG. 2). When only half the amount of ammonium citrate was used (Example 10), citrate to TPABr equals 0.05—equivalents of citrate to moles of silica equals 0.16 which is similar to the reaction mixture of Example 6, again, a good ZSM-5 was obtained. However, in the citrate mixture, both the citric acid and ammonia were decreased, thereby the pH for FIG. 2b was higher than that for FIG. 3.

Figures 4, 4A:
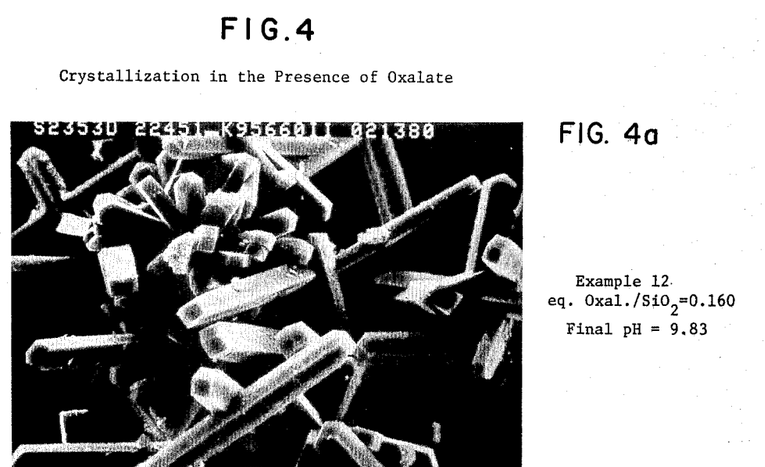
FIGS. 4a, 4b and 4c are scanning electron-micrographs of the products of Examples 12, 13 and 14 respectively.
Figure 4B:
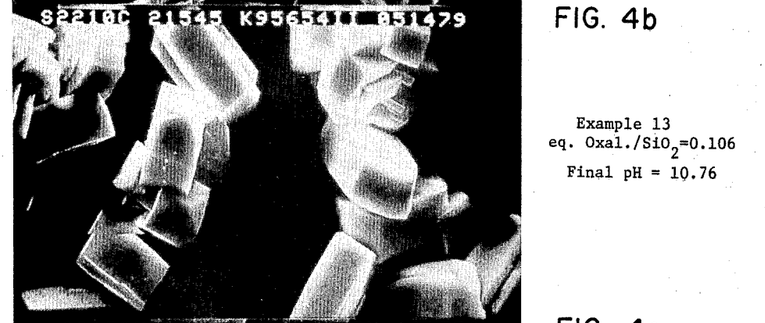
Figure 4C:
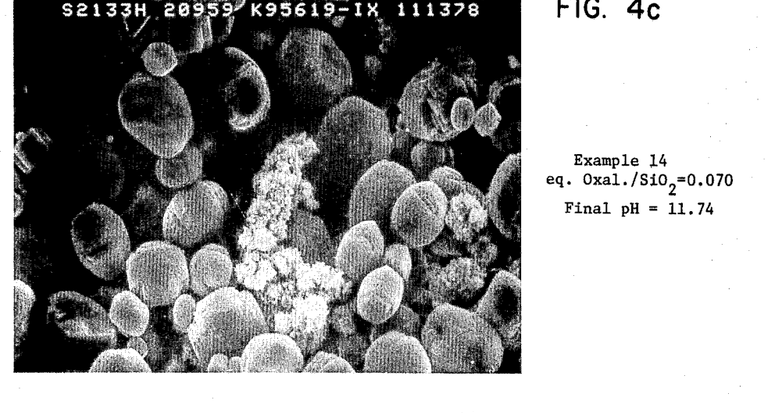

When the amount of ammonium oxalate was reduced (Examples 12-13), the resulting products were similar to those obtained with tartrate, i.e., see Table 2 and FIG. 4. Sodium oxalate, instead of ammonium oxalate, was used in Example 14 resulting in a higher pH and more crystallization of quartz. Results are shown in Table 2.

EXAMPLES 15-17

Figure 5:
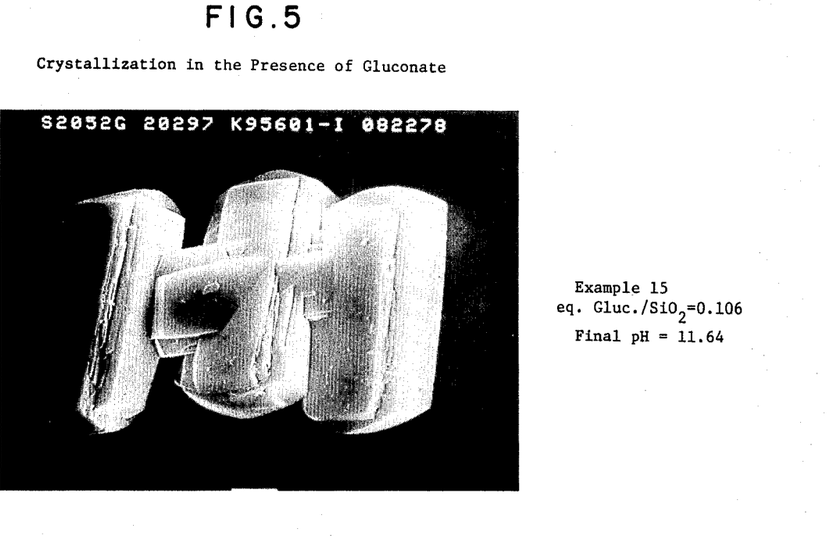
FIG. 5 is a scanning electron-micrograph of the product of Example 15.

Crystallizaton of High Silica ZSM-5 in the Presence of Gluconate, Salicylate and EDTA Reaction mixtures were prepared containing 2.1 mols of gluconate or salicylate per mol of TPABr which is equivalent to 0.105 equivalents of buffer per mol of silica and these had pH values above 11 attributable to the weaker acids. The gluconate (Example 15) decomposed during crystallization and the carbon formed was burned off by calcination at 550° C. before analytical tests were carried out. The crystals obtained with gluconate are high twinned (see FIG. 5).

Figure 6:
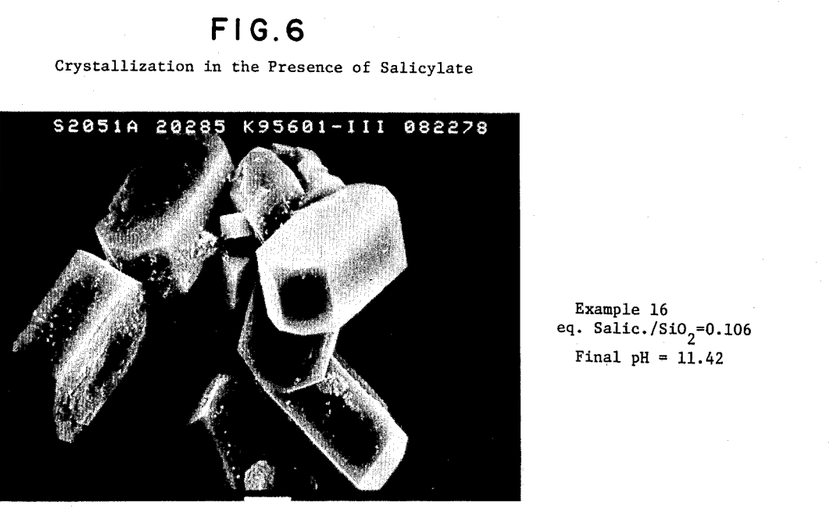
FIG. 6 is a scanning electron-micrograph of the product of Example 16.

Less twinning is observed in the product of Example 16 obtained in the presence of salicylic acid (see FIG. 6).

Figures 1, 1A:
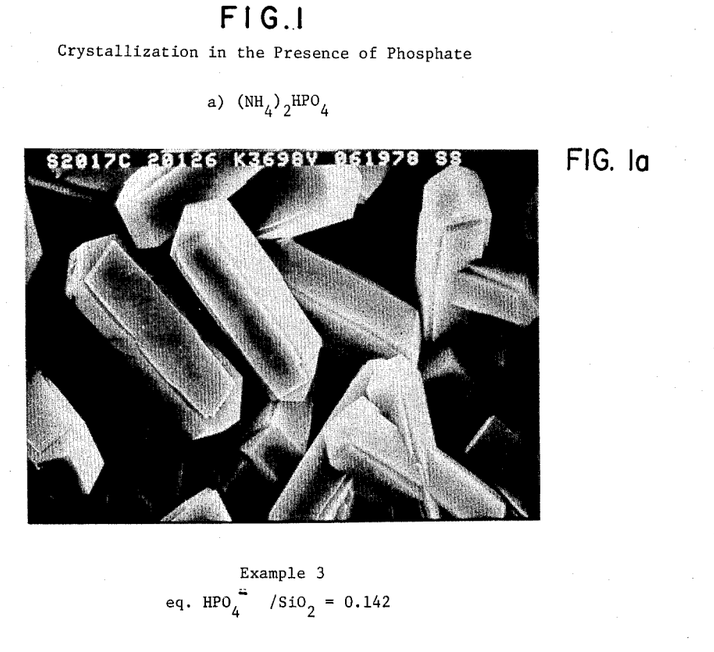
FIGS. 1a and 1b are scanning electron-micrographs of the product of Examples 3 and 4 respectively.
Figure 1B:
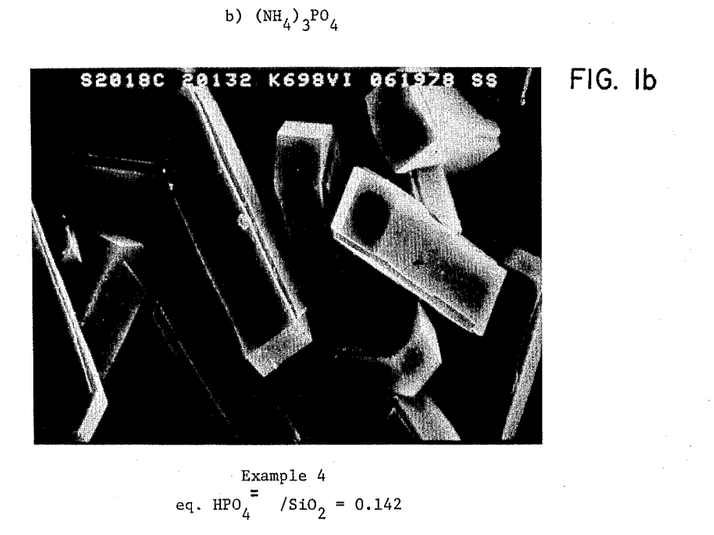
Figures 7, 7A:
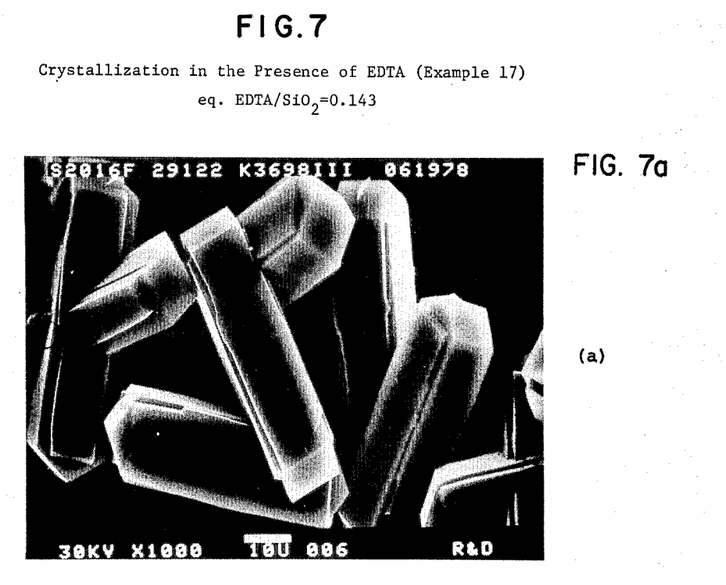
FIG. 7(a) and 7(b) are scanning electron-micrographs of the product of Example 17.
Figure 7B:
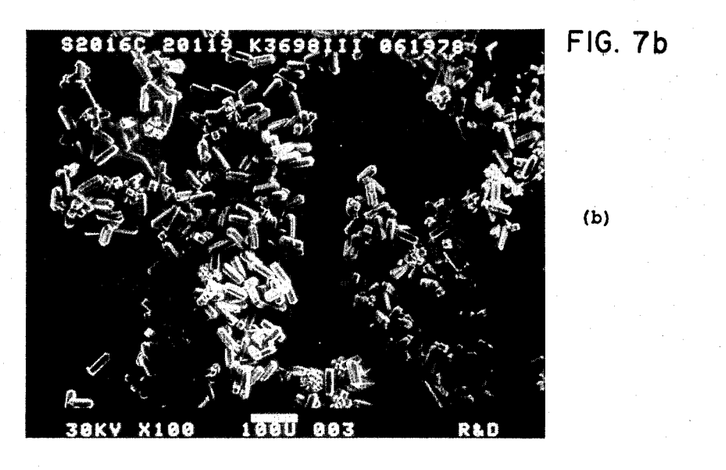

Crystals similar to those obtained when phosphate was present in the reaction mixtures, i.e., see FIG. 1, crystallized in the presence of ethylenediaminetetraacetate (EDTA) (FIGS. 7a and b). Multiple twinning resulting in rudimentary spherulites can also be seen in FIG. 7b. The material has a high crystallinity which is also evident from the high n-hexane and low cyclohexane sorption capacities. See Table 3.

EXAMPLES 18-25

Crystallization in the Presence of Acetate and Carbonate

Ammonium acetate was used in Examples 18-21. With 4.2 moles of acetate/mole of TPABr which is equivalent to 0.21 equivalents of buffer per mol of silica, the crystallization was still incomplete after 495 hours. With less ammonium acetate, 3.2 moles/mol of TPABr (0.16 equivalents per mol of $SiO_2$), somewhat more rapid crystallization was observed, although it was still incomplete after 163 hours (see Example 19). The scanning electron micrograph shows the same rod-shaped crystals as observed previously from low-pH reaction mixtures, e.g., with tartrate (see Example 6, FIG. 2a) and oxalate (Example 12, FIG. 4a).

Figures 8, 8A:
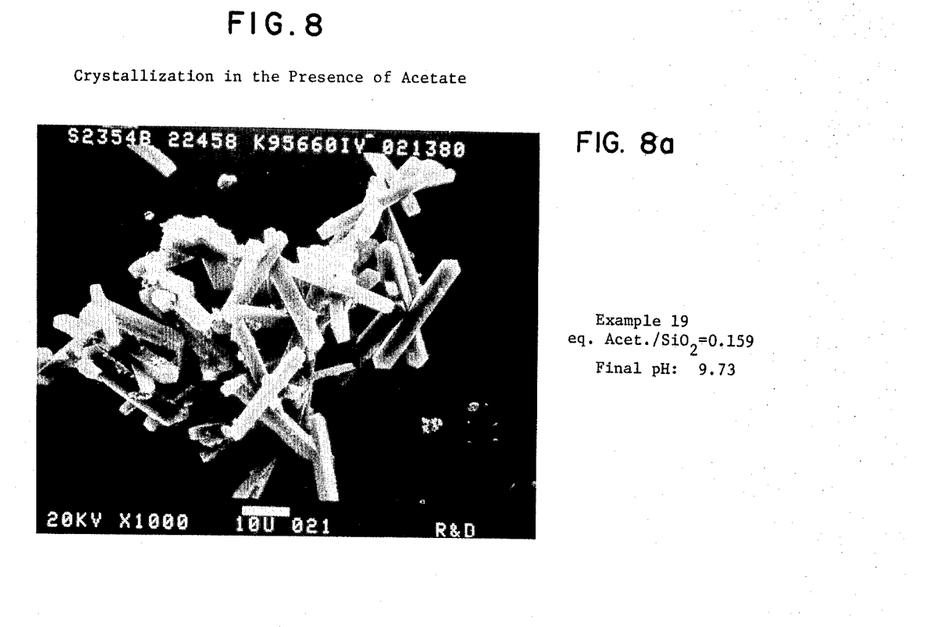
FIGS. 8a and 8b are scanning electron-micrographs of the products of Examples 19 and 20 respectively.
Figure 8B:
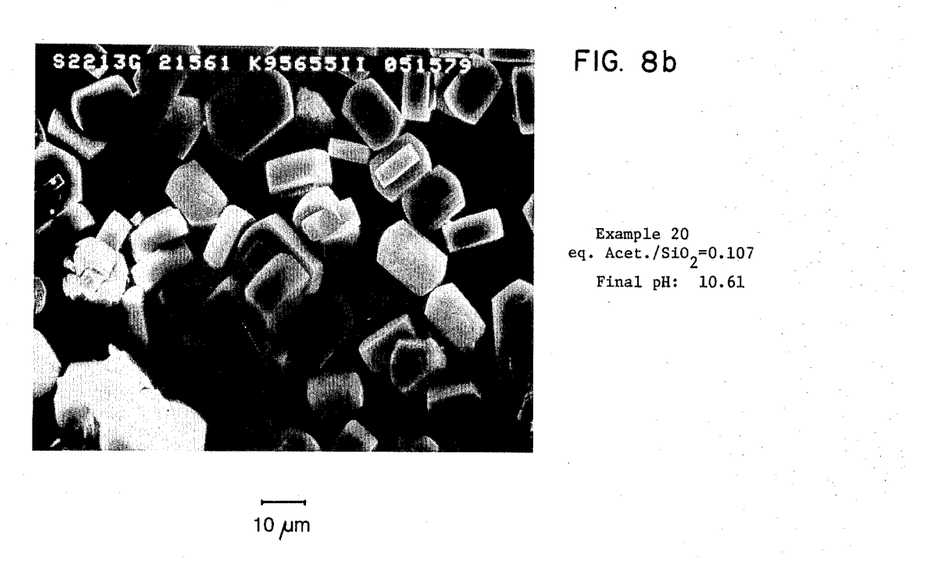

At 2.1 moles of ammonium acetate/mole of TPABr (0.105 equivalents of ammonium acetate per mole of $SiO_2$), a well crystallized product was obtained in 65 hours (Example 20). The ratio of width/length of these crystals is considerably increased and some 90° twinning is observed (see FIG. 8b). When the amount of NaOH was reduced (see Example 21), a material similar to that of Example 19 (FIG. 8a) was obtained.

Figures 9, 9A:
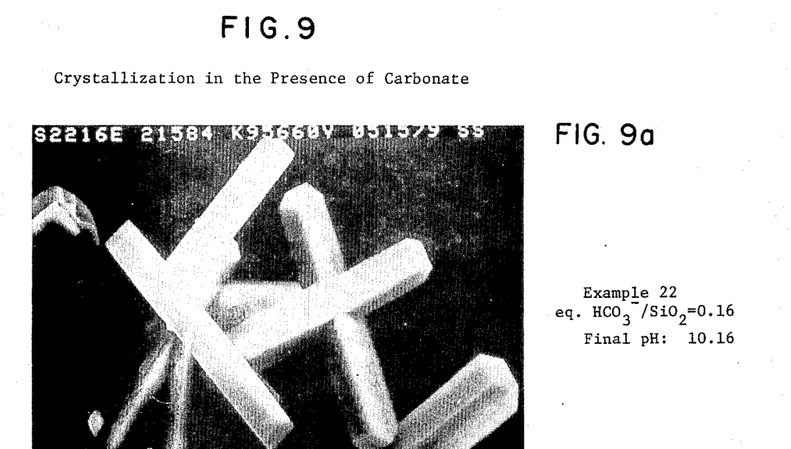
FIGS. 9a, 9b and 9c are scanning electron-micrographs of the products of Examples 22, 23 and 24 respectively.

Ammonium carbonate was used in the remaining examples of Table 4 (Examples 22-25). At 3.2 moles of ammonium carbonate per mole of TPABr (0.16 equivalents of $HCO_3-$ per mole of silica), rod-shaped crystals were obtained simultaneously with more stubby and 90° twinned crystals (see FIG. 9a). Surface etching, caused by redissolution and beginning recrystallization indicates that the crystallization was completed considerably sooner than after 122 hours when the reaction was terminated.

Figure 9B:
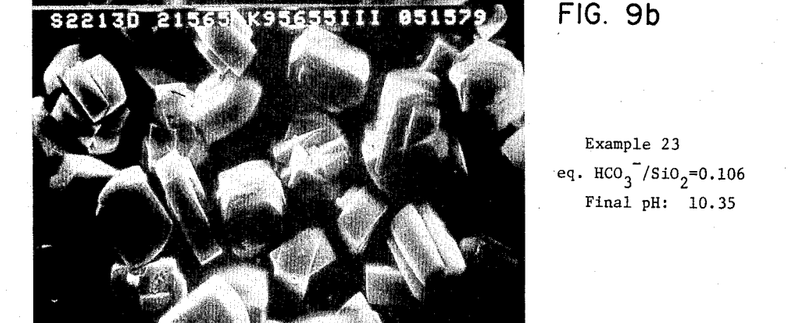
Figure 9C:
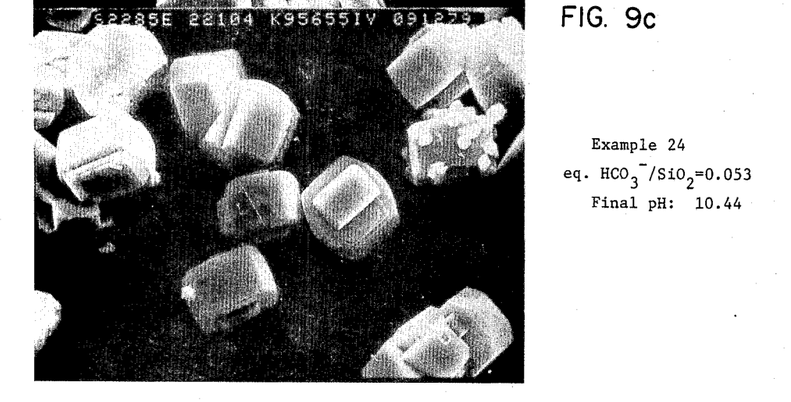

Considerably shorter crystals formed at carbonate/TPABr of 2.1 (FIG. 9b) and at 1.05 (FIG. 9c) (0.105 and 0.055 equivalents of bicarbonate per mole of silica). Although the latter product (Example 24) had good sorptive properties, beginning redissolution and deposition of quartz crystals caused by the long time at 200° C., is evident in FIG. 9c.

Figure 10:
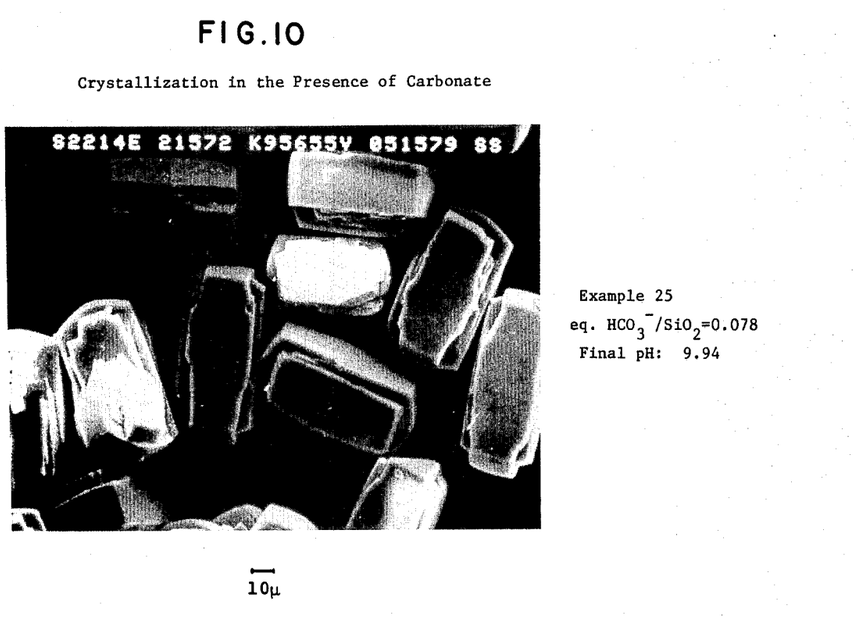
FIG. 10 is a scanning electron-micrograph of the product of Example 25.

Very large, highly twinned crystals, about 40×70 Angstrom units in size, were obtained when the ratio of NaOH/TPABr was lowered to 2 (see Example 25, Table 4 and FIG. 10). The final pH of this reaction mixture was about the same as the initial pH. Results are shown in Table 4.

TABLE 1

| Example | 1 | 2 | 3 | 4 |
|---|---|---|---|---|
| Mol/mol of TPABr | | | | |
| $(NH_4)_2HPO_4$ | 4.2 | 2.1 | 1.4 | 1.4 |
| $NH_4OH$ | — | — | — | 1.4 |
| $H_2O$ | 275 | 275 | 275 | 275 |
| Initial pH | 9.5 | 9.9 | 10.5 | 10.7 |
| Crystallization | | | | |
| Time, Hrs. | 128 | 128 | 65 | 65 |
| Temp., °C. | 200 | 200 | 200 | 200 |
| Final pH | 9.4 | 9.5 | 10.1 | N.A. |
| X-ray | | | | |
| Identification | Amor. | ZSM-5 | ZSM-5 | ZSM-5 |
| Cryst. % | | 80 | 95 | 85 |
| Sorption, g/100 g | | | | |
| Cyclohexane, 20 Torr | | 1.3 | 0.6 | 0.6 |
| n-$C_6H_{14}$, 20 Torr | | 7.7 | 10.7 | 10.7 |
| $H_2O$, 12 Torr | | 1.2 | 1.4 | 1.5 |
| Composition of Product | | | | |
| $SiO_2$, wt. % | | 89.3 | 86.6 | 87.1 |
| $Al_2O_3$, ppm | | 450 | 440 | 480 |
| Na, wt. % | | 0.02 | 0.08 | 0.08 |
| N, wt. % | | 0.73 | 0.89 | 0.82 |
| P, wt. % | | 0.003 | 0.01 | 0.01 |
| Ash, wt. % | | 91.1 | 88.8 | 88.9 |
| $SiO_2/Al_2O_3$ (molar) | | 3374 | 3346 | 3085 |
| Length-to-Width | — | — | 3.8 | 4.3 |
| SEM FIG. | | | 1a | 1b |

TABLE 2

| Example | 5 | 6 | 7 | 8 | 9 | 10 | 11 | 12 | 13 | 14 |
|---|---|---|---|---|---|---|---|---|---|---|
| Moles/Mole of TPABr | | | | | | | | | | |
| Tartaric Acid | 2.1 | 1.58 | 1.05 | 0.7 | — | — | — | — | — | — |
| Citric Acid | — | — | — | — | 2.1 | 1.05 | — | — | — | — |
| $(NH_4)_2C_2O_4$ | — | — | — | — | — | — | 2.1 | 1.59 | 1.05 | — |
| $Na_2C_2O_4$ | — | — | — | — | — | — | — | — | — | 0.7 |
| $NH_4OH$ | 4.2 | 4.2 | 4.2 | 4.2 | 6.4 | 3.2 | — | — | — | — |
| $H_2O$ | 286 | 286 | 286 | 286 | 267 | 260 | 310 | 310 | 310 | 310 |
| Initial pH | 9.8 | 10.4 | 11.7 | 12.6 | 9.2 | 10.35 | 9.6 | 10.0 | 11.35 | 13.1 |
| Crystallization | | | | | | | | | | |
| Time, Hrs. | 168 | 166 | 67 | 91 | 72* | 92 | 211 | 165 | 66 | 71 |
| Temp., °C. | 200 | 200 | 200 | 200 | 200 | 200 | 200 | 200 | 200 | 200 |
| Final pH | 8.7 | 10.13 | 10.67 | 11.06 | 9.38 | 10.16 | N.A. | 9.83 | 10.76 | 11.74 |
| X-Ray | | | | | | | | | | |
| Identification | Amor. | ZSM-5 | ZSM-5 | ZSM-5 + some Quartz | ZSM-5 + Amor. | ZSM-5 | Amor. + ZSM-5 | ZSM-5 | ZSM-5 | ZSM-5 + some Quartz |
| Cryst. % | | 115 | 135 | 145 | 55 | 110 | 35 | 95 | 135 | 100 |
| Sorption, g/100 g | | | | | | | | | | |
| Cyclohexane, 20 Torr | | 1.4 | 0.5 | 1.6 | 2.4 | 0.6 | 1.5 | 1.5 | 0.4 | 2.6 |
| n-$C_6H_{14}$, 20 Torr | | 9.5 | 10.5 | 10.8 | 4.7 | 10.6 | | 8.9 | 10.9 | 11.2 |
| $H_2O$, 12 Torr | | 0.7 | 2.9 | 5.1 | 1.9 | 1.3 | | 0.7 | 2.8 | 6.4 |
| Composition of Product | | | | | | | | | | |
| $SiO_2$, wt. % | | 86.5 | 84.4 | 86.1 | | 86.7 | | 87.0 | 83.5 | 85.9 |
| $Al_2O_3$, ppm | | 430 | 450 | 470 | | 460 | | 460 | 430 | 500 |
| Na, wt. % | | 0.03 | 0.35 | 0.59 | | 0.06 | | 0.02 | 0.33 | 0.84 |
| N, wt. % | | 0.82 | 0.87 | 0.78 | | 0.92 | | 0.79 | 0.85 | 0.76 |
| Ash, wt. % | | 89.1 | 88.1 | 88.7 | | 89.1 | | 89.9 | 87.9 | 86.9 |
| $SiO_2/Al_2O_3$ (molar) | | 3420 | 3188 | 3114 | | 3204 | | 3215 | 3301 | 2921 |
| Length-to-width | — | 7.5 | 1.7 | 0.9 | — | 7–8 | — | 12 | — | — |
| SEM FIG. | | 2a | 2b | 2c | | 3 | | 4a | 4b | 4c |

*followed by an additional heating at 180° C. for 139 hours.

TABLE 3

| Example | 15 | 16 | 17 |
|---|---|---|---|
| Moles/Mole of TPABr | | | |
| Gluconic Acid | 2.1 | — | — |
| Salicylic Acid | — | 2.1 | — |
| EDTA | — | — | 0.7 |
| $NH_4OH$ | 2.1 | 2.1 | 1.4 |
| $H_2O$ | 280 | 257 | 279 |
| Initial pH | 11.6 | 11.4 | 10.3 |
| Crystallization | | | |
| Time, Hrs. | 67 | 48 | 67 |
| Temp., °C. | 200 | 200 | 200 |
| Final pH | 11.64 | 11.42 | 10 |
| X-Ray | | | |
| Identification | ZSM-5 | ZSM-5 | ZSM-5 |
| Cryst. % | 75 | 100 | 105 |
| Sorption, g/100 g | | | |
| Cyclohexane, 20 Torr | 0.5 | 0.4 | 0.3 |
| n-$C_6H_{14}$, 20 Torr | 11.4 | 11.1 | 11.0 |
| $H_2O$, 12 Torr | 2.0 | 2.4 | 1.6 |
| Composition of Product | | | |
| $SiO_2$, wt. % | 96.7 | 86.8 | 86.8 |
| $Al_2O_3$, ppm | 490 | 760 | 580 |
| Na, wt. % | 0.24 | 0.34 | 0.10 |
| N, wt. % | — | 0.81 | 0.69 |
| Ash, wt. % | 100* | 89.2 | 88.8 |
| $SiO_2/Al_2O_3$, molar | 3355 | 1942 | 2544 |
| Length-to-width | 2.5 | 2 | 3 |
| SEM FIG. | 5 | 6 | 7 |

*calcined form

TABLE 4

| Example | 18 | 19 | 20 | 21 | 22 | 23 | 24 | 25 |
|---|---|---|---|---|---|---|---|---|
| Moles/Mole of TPABr | | | | | | | | |
| $NH_4$—Acetate | 4.2 | 3.2 | 2.1 | 2.2 | — | — | — | — |
| $(NH_4)_2CO_3$ | — | — | — | — | 3.2 | 2.1 | 1.05 | 1.1 |
| NaOH | 3.1 | 3.1 | 3.1 | 2.0 | 3.1 | 3.1 | 3.1 | 2.0 |
| $H_2O$ | 275 | 275 | 275 | 277 | 275 | 275 | 275 | 277 |
| Initial pH | 9.80 | 10.33 | 11.60 | 9.92 | 9.67 | 9.86 | 11.07 | 9.98 |
| Crystallization Time, Hrs. | 495 | 163 | 65 | 662 | 122 | 64 | 165 | 72 |
| Final pH | 8.78 | 9.73 | 10.61 | 9.73 | 10.16 | 10.35 | 10.44 | 9.94 |

TABLE 4-continued

| Example | 18 | 19 | 20 | 21 | 22 | 23 | 24 | 25 |
|---|---|---|---|---|---|---|---|---|
| X-Ray Cryst., % | 90 | 95 | 140 | 100 | 110 | 155 | 130 | 85 |
| Sorption, g/100 g | | | | | | | | |
| Cyclohexane, 20 Torr | 0.7 | 2.4 | 0.6 | 3.1 | 1.5 | 0.7 | 2.3 | 0.8 |
| n-Hexane, 20 Torr | 8.4 | 9.4 | 10.7 | 9.7 | 11.1 | 10.9 | 11.4 | 10.8 |
| Water, 12 Torr | 0.2 | 0.8 | 2.8 | 0.2 | 1.9 | 3.5 | 4.1 | 0.1? |
| Composition of Product | | | | | | | | |
| $SiO_2$, wt. % | N.A. | 89.7[2] | 86.3 | 87.7 | 84.1 | 83.4 | 86.5[2] | 84.7 |
| $Al_2O_3$, ppm | N.A. | 430 | 445 | 460 | 440 | 495 | 430 | 480 |
| Na, wt. % | N.A. | 0.05 | 0.37 | 0.05 | 0.24 | 0.48 | 0.57 | 0.30 |
| N, wt. % | N.A. | 0.81 | 0.89 | 0.87 | 0.82 | 1.18 | 0.75 | 0.81 |
| Ash, wt. % | N.A. | 89.8 | 88.6 | 89.0 | 87.8 | 86.5 | 87.3 | 88.4 |
| $SiO_2/Al_2O_3$, molar | N.A. | 3546 | 3297 | 3241 | 3249 | 2864 | 3420 | 3000 |
| Length-to-Width | — | 7 | 1.8 | 7 | 5 | 1–2 | 1 | 2.3 |
| SEM, FIG. | — | 8a | 8b | — | 9a | 9b | 9c | 10 |

[1] All products were ZSM-5, no crystalline impurities were detected by x-ray diffraction
[2] By difference

I claim:

1. In the process for the production of high-silica ZSM-5 zeolites having a silica to alumina molar ratio of greater than 70 from a reaction mixture containing a source of alkali metal oxide, a source of silica, quaternary ammonium ion and water wherein the reaction mixture is held at elevated temperatures and pressures until crystals are formed, the improvment which comprises adding to said reaction mixture a non-fluoride buffer capable, at temperatures of about 200° C., of controlling the final pH to a value within the range of 9.5–10.5, in such amounts that about 0.1 to 0.35 equivalents of buffer per mol of silica are present in the reaction medium, so as to produce rod-shaped ZSM-5 having a length-to-width ratio greater than 3, wherein the buffer is selected from the group consisting of ammonium or alkali metal salts of phosphate, tartrate, citrate, oxalate, ethylenediaminetetraacetate and acetate.

2. The process of claim 1 wherein the length-to-width ratio is greater than 4.

3. The process of claim 1 wherein the length-to-width ratio is greater than 5.

4. The process of claim 1 wherein said high-silica ZSM-5 zeolites have a silica to alumina ratio greater than 500.

* * * * *